(12) United States Patent
Iwata et al.

(10) Patent No.: US 9,276,441 B2
(45) Date of Patent: Mar. 1, 2016

(54) STATOR CORE OF MOTOR, AND MANUFACTURING METHOD

(75) Inventors: Kazuo Iwata, Yokohama (JP); Yoshinobu Mino, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 301 days.

(21) Appl. No.: 13/877,873

(22) PCT Filed: Sep. 27, 2011

(86) PCT No.: PCT/JP2011/005439
§ 371 (c)(1),
(2), (4) Date: Apr. 4, 2013

(87) PCT Pub. No.: WO2012/046408
PCT Pub. Date: Apr. 12, 2012

(65) Prior Publication Data
US 2013/0187514 A1    Jul. 25, 2013

(30) Foreign Application Priority Data

Oct. 8, 2010   (JP) ................................ 2010-228989
Nov. 29, 2010  (JP) ................................ 2010-265531

(51) Int. Cl.
   *H02K 1/18*   (2006.01)
   *H02K 1/16*   (2006.01)
   (Continued)

(52) U.S. Cl.
   CPC ................ *H02K 1/185* (2013.01); *H02K 1/16* (2013.01); *H02K 15/024* (2013.01); *H02K 2201/09* (2013.01)

(58) Field of Classification Search
   CPC ......... H02K 1/148; H02K 1/185; H02K 1/16; H02K 2201/09; H02K 15/024; H02K 15/02; Y10T 29/49009; Y10T 29/49075
   USPC ......... 310/216.009, 216.008, 254.1, 216.135, 310/215; 29/596
   See application file for complete search history.

(56) References Cited

U.S. PATENT DOCUMENTS 3,202,851 A  *  8/1965  Dehlendorf et al. ... 310/216.048
4,538,345 A     9/1985  Diederichs
(Continued)

FOREIGN PATENT DOCUMENTS

JP       9-98545       4/1997
JP    H 10-174319  *  2/1998
(Continued)

OTHER PUBLICATIONS

English translation for JP 2010-193659.*
(Continued)

*Primary Examiner* — Terrance Kenerly
*Assistant Examiner* — Ahmed Elnakib
(74) *Attorney, Agent, or Firm* — Jordan and Hamburg LLP (57) ABSTRACT

A stator core comprises a circumferentially deformable part formed on a radially outer peripheral side of a yoke; circumferentially facing divided parts formed on a radially inner peripheral side of the yoke, each having a dividing line that is oriented in a radial direction and reaches a portion between teeth and divided surfaces that face each other without a gap; and radially facing divided parts formed at the center between the radially inner and outer sides of the yoke along the circumferential direction at the predetermined interval, and each having divided surfaces that face each other in the radial direction, and being continuous at one ends with the respective circumferentially facing divided parts. The circumferentially facing divided parts each have a compressive stress being smaller than a compressive stress acting on the circumferentially deformable part or being zero.

20 Claims, 11 Drawing Sheets

(51) Int. Cl.
*H02K 15/02* (2006.01)
*H02K 1/14* (2006.01)

(56) References Cited

U.S. PATENT DOCUMENTS

| | | | | |
|---|---|---|---|---|
| 4,654,552 A * | 3/1987 | Fritzsche | H02K 1/16 |
| | | | 310/216.043 |
| 6,002,191 A * | 12/1999 | Saban | H02K 1/26 |
| | | | 29/598 |
| 7,019,433 B2 * | 3/2006 | Hashimoto | H02K 29/03 |
| | | | 310/402 |
| 7,077,355 B2 * | 7/2006 | Banba | H02K 1/148 |
| | | | 242/433.4 |
| 8,035,271 B2 * | 10/2011 | Sano | H02K 1/148 |
| | | | 310/216.049 |
| 8,907,542 B2 * | 12/2014 | Miyaji | H02K 1/16 |
| | | | 29/596 |
| 2002/0125782 A1 * | 9/2002 | Peachee | H02K 1/148 |
| | | | 310/166 |
| 2009/0066183 A1 * | 3/2009 | Aramaki | H02K 1/148 |
| | | | 310/216.008 |
| 2009/0289522 A1 * | 11/2009 | Buban | H02K 1/148 |
| | | | 310/216.113 |
| 2010/0001611 A1 * | 1/2010 | Utaka | H02K 1/16 |
| | | | 310/216.009 |
| 2010/0007236 A1 | 1/2010 | Sano et al. | |
| 2010/0052465 A1 * | 3/2010 | Hayashi | H02K 1/185 |
| | | | 310/216.009 |
| 2010/0231084 A1 * | 9/2010 | Kinoshita | H02K 1/24 |
| | | | 310/216.009 |
| 2012/0086300 A1 * | 4/2012 | Kim | 310/215 |
| 2013/0049521 A1 * | 2/2013 | Sato | 310/216.008 |
| 2013/0249346 A1 * | 9/2013 | Nagai | H02K 1/146 |
| | | | 310/216.065 |

FOREIGN PATENT DOCUMENTS

| | | | |
|---|---|---|---|
| JP | 10-17419 | | 6/1998 |
| JP | 11-341716 | | 12/1999 |
| JP | 2002-113601 | | 5/2002 |
| JP | 2005-051941 | * | 2/2005 |
| JP | 2007-082275 | * | 3/2007 |
| JP | 2008-104325 | | 5/2008 |
| JP | 2008-206262 | * | 9/2008 |
| JP | 2005-51941 | | 12/2008 |
| JP | 2008/312304 | | 12/2008 |
| JP | 2009-261162 | | 11/2009 |
| JP | 2010-115095 | | 5/2010 |
| JP | 2010-193659 | * | 9/2010 |
| JP | 2011-015592 | * | 1/2011 |

OTHER PUBLICATIONS

English translation for JP 2008-206262.*
English translation for JPH 10-174319.*
English translation for JP 2005-051941.*
English translation for JP 2007-082275.*
English translation for JP 2011-015592.*

* cited by examiner

STATOR CORE OF MOTOR, AND MANUFACTURING METHOD

FIELD OF THE INVENTION

The present invention relates to a stator core for a motor and its manufacturing method.

BACKGROUND ART

Figure 21:
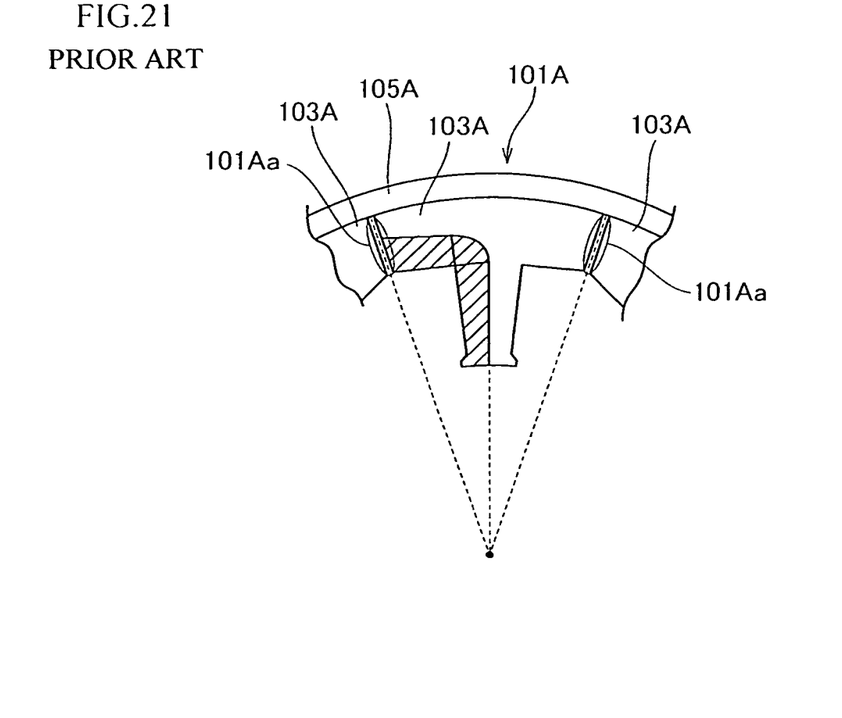
FIG. 21 is a front main part view illustrating a state of a stator core attached to a core case by shrink-fitting according to a prior art.
Figure 22:
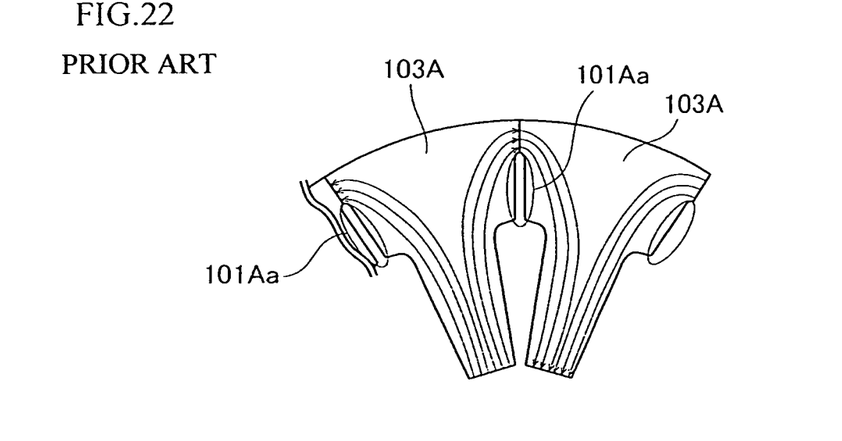
FIG. 22 is a front main part view illustrating the stator core according to the prior art.
Figure 23:
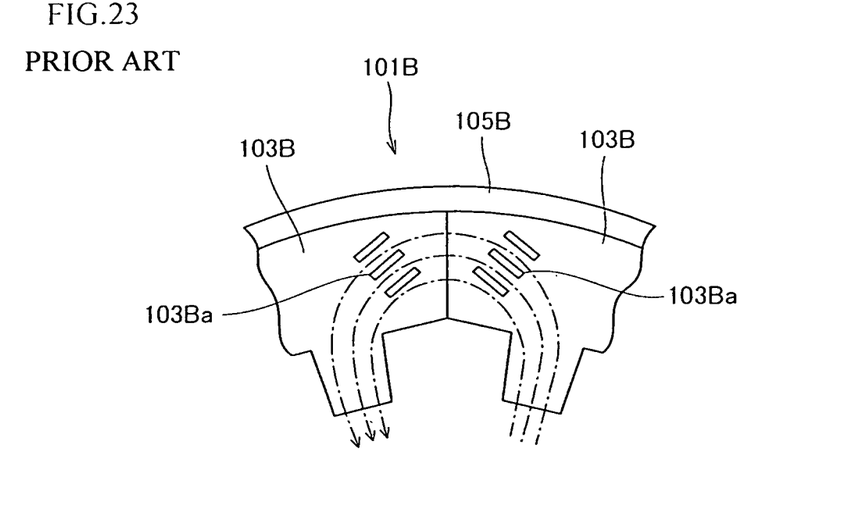
FIG. 23 is a front main part view illustrating a state of a stator core attached to a core case by shrink-fitting according to a prior art.
Figure 24:
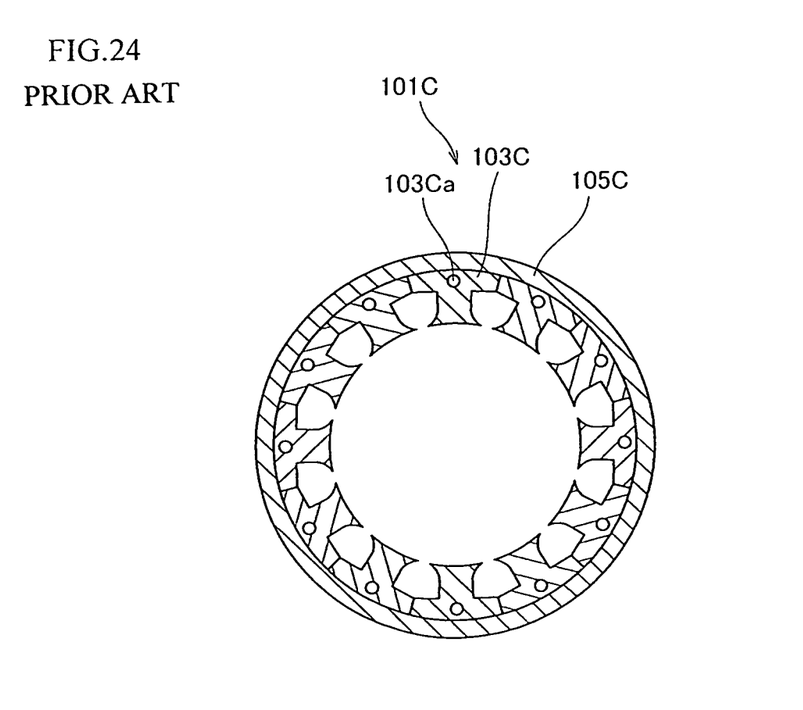
FIG. 24 is a sectional view illustrating a state of a stator core attached to a core case by shrink-fitting according to a prior art.

Conventionally, there are ones disclosed in Patent Documents 1, 2 and 3 as illustrated in FIGS. 21 to 24. FIG. 21 is a front main part view illustrating a state of a stator core attached to a core case by shrink-fitting. FIG. 22 is a front main part view illustrating the stator core. FIG. 23 is a front main part view illustrating a state of a stator core attached to a core case by shrink-fitting. FIG. 24 is a sectional view illustrating a state of a stator core attached to a core case by shrink-fitting.

In all FIGS. 21 to 24, stator core segments 103A, 103B and 103C of stator cores 101A, 101B and 101C of motors are joined to form an annular shape and are received and fixed by shrink-fitting in core cases 105A, 105B and 105C.

Where, there is a problem that iron loss increases due to compressive stress generated in the stator core segments 103A, 103B or 103C at the time of the shrink-fitting so that output efficiency of a motor comes down.

To address this, the stator core 101A of FIGS. 21 and 22 has slits 101Aa made therein so as not to generate compressive stress, and the stator cores 10B and 103C of FIGS. 22 and 24 have holes 103Ba and 103Ba to reduce compressive stress.

However, the slits 101Aa and the holes 103Ba and 103Ca make an increase of magnetic resistance and result in a problem of deteriorating magnetic properties.

On the other hand, in the case of the slits 101Aa, it is conceivable to compressively deform contacting portions on the outer peripheral side toward a direction to eliminate the slits (circumferential direction) by the compressive stress.

However, only the deformation amount due to the distortion around the contacting portions on the outer peripheral side results in the small amount of the compressive deformation of the contacting portions, and it is physically difficult to eliminate the slit 101Aa.

Such a problem also exists in stator cores other than a divided-type stator core.

Patent Document 1: JP 2005-51941 A
Patent Document 2: JP 2009-261162 A
Patent Document 3: JP 2002-136013 A

SUMMARY OF THE INVENTION

The problem to be solved by the invention lies in that a reduction in compressive stress by means of slits or holes causes an increase in magnetic resistance and deteriorates magnetic properties.

The present invention, in order to reduce compressive stress at a portion having a high density of magnetic flux without forming slits or holes, characterizes a stator core for a motor in that the stator core including an annular yoke and teeth protruding radially inward from an inner periphery of the yoke, an outer periphery of the yoke attached to an inner periphery of an annular member with a radially inwardly tightening interference, comprises a circumferentially deformable part formed on a radially outer peripheral side of the yoke and compressively deformed in a circumferential direction by the tightening interference; circumferentially facing divided parts formed on a radially inner peripheral side of the yoke, and each having a dividing line that is oriented in a radial direction and reaches a portion between the teeth and divided surfaces that face each other without a gap; and radially facing divided parts formed between the radially inner and outer sides of the yoke along the circumferential direction at a predetermined interval, each having divided surfaces that face each other in the radial direction, and being continuous at one ends with the respective circumferentially facing divided parts, the divided surfaces moved relative to each other in the circumferential direction by compressive deformation of the circumferentially deformable part, wherein the circumferentially facing divided parts are in a state of a compressive stress being smaller than a compressive stress acting on the circumferentially deformable part or being zero.

The present invention characterizes a stator core manufacturing method for manufacturing a stator core for a motor in that the stator core manufacturing method comprises a segment processing step of processing a plurality of circumferential stator core segments divided at the circumferentially pressed divided parts, the circumferentially facing divided parts, and the radially facing divided parts; and an assembly step of joining the plurality of stator core segments annularly in the circumferential direction and attaching the plurality of stator core segments to the inner periphery of the annular member with the radially inwardly tightening interference, thereby pressing the divided surfaces of the circumferentially pressed divided parts against each other and facing the divided surfaces of the circumferentially facing divided parts without a gap in the circumferential direction.

The present invention characterizes a stator core manufacturing method for manufacturing the stator core for a motor in that the stator core manufacturing method comprises a semi-finished core processing step of forming a semi-finished stator core having the ring part, circumferentially facing divided part correspondents, and radially facing divided part correspondents; and an assembly step of attaching the semi-finished stator core to the inner periphery of the annular member with the radially inwardly tightening interference, thereby causing compressive deformation of the ring part and facing the divided surfaces of the circumferentially facing divided parts without a gap in the circumferential direction.

Because of the above configuration, the stator core for a motor of the present invention generates the compressive stress by the attachment to the annular member with the tightening interference in the circumferentially deformable part on the outer peripheral side of the yoke, and the circumferentially facing divided parts on the inner peripheral side of the yoke are put into the state of the compressive stress being smaller than the compressive stress acting on the circumferentially deformable part or being zero.

As a result, much of magnetic flux passes through the circumferentially facing divided parts involving less compressive stress, to realize small magnetic loss such as iron loss and the stable attachment to the annular member.

Because of the above configuration, the stator core manufacturing method of the present invention produces the plurality of stator core segments, annularly joins the plurality of stator core segments in the circumferential direction, and attaches them to the inner periphery of the annular member with the radially inwardly tightening interference, thereby generating the compressive stress based on the tightening interference in the circumferentially pressed divided parts so that the circumferentially facing divided parts are put into the state of the compressive stress being smaller than the compressive stress acting on the circumferentially pressed divided parts or being zero.

Because of the above configuration, the stator core manufacturing method of the present invention produces the semi-finished stator core and attaches it to the inner periphery of the annular member with the radially inwardly tightening interference, thereby generating the compressive stress based on the tightening interference in the ring part so that the circumferentially facing divided parts are put into the state of the compressive stress being smaller than the compressive stress acting on the circumferentially deformable part or being zero.

EMBODIMENTS FOR CARRYING OUT THE INVENTION

The object capable of reducing compressive stress without forming slits or holes is accomplished by a stator core that is provided with a circumferentially deformable part, circumferentially facing divided parts, and radially facing divided parts.

First Embodiment

Figure 1:
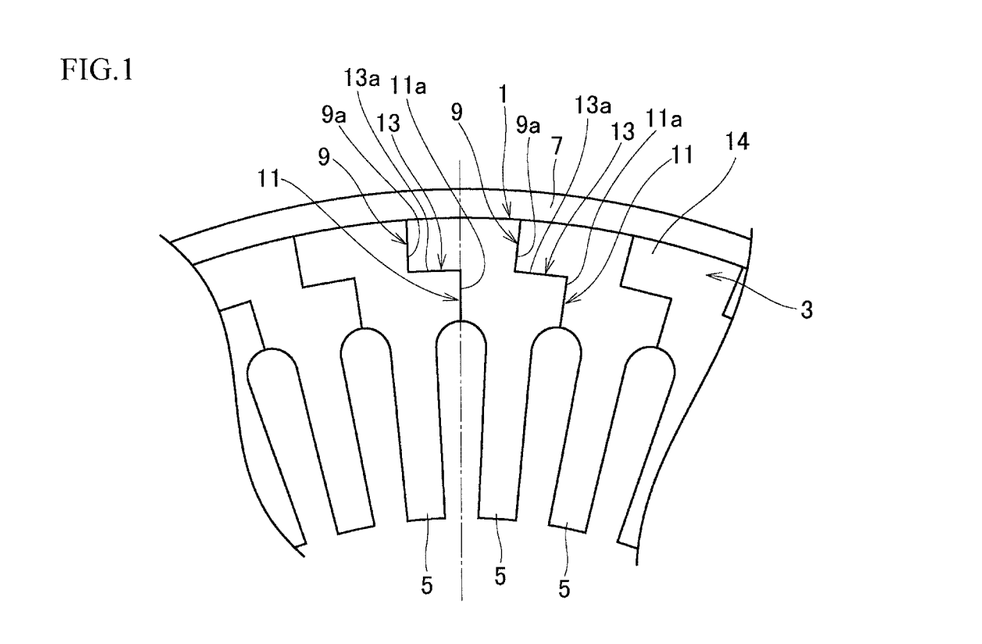
FIG. 1 is a front main part view illustrating a state of a stator core attached to a motor case by shrink-fitting according to a first embodiment.
Figure 2:
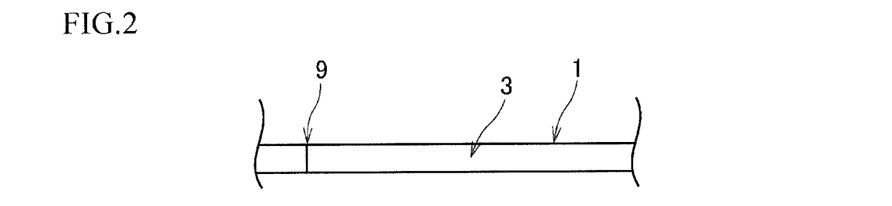
FIG. 2 is a side view illustrating the stator core at circumferentially pressed divided parts according to the first embodiment.
Figure 3:
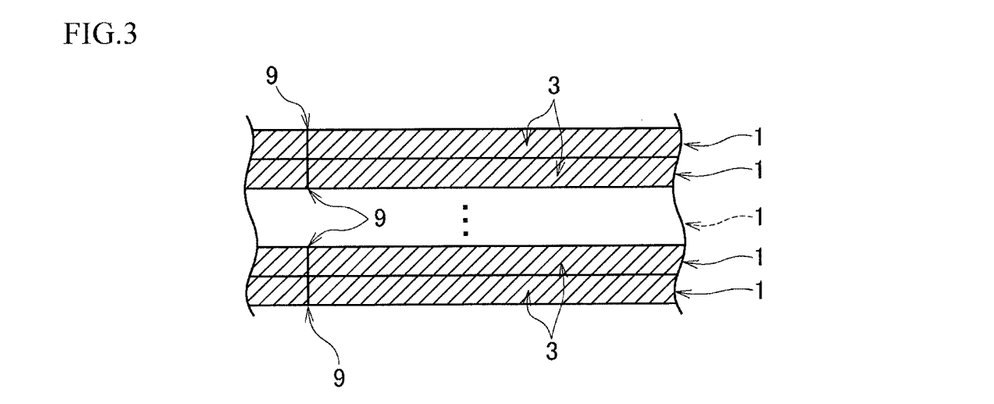
FIG. 3 is a sectional view illustrating a stack of the stator cores according to the first embodiment.

FIG. 1 is a front main part view illustrating a state of a stator core attached to a motor case by shrink-fitting, FIG. 2 is a side view illustrating the stator core at circumferentially pressed divided parts, and FIG. 3 is a sectional view partly illustrating a stack of the stator cores.

As illustrated in FIGS. 1 to 3, a stator core 1 is made of a magnetic steel plate and has an annular yoke 3 and teeth 5 protruding radially inward from an inner periphery of the yoke 3. A plurality of stator cores 1 are stacked one on another, and an outer periphery of each yoke 3 in the stacked state is attached to an inner periphery of a motor case 7 as an annular member by shrink-fitting with a radial inward tightening interference.

The yoke 3 is provided with circumferentially pressed divided parts 9, circumferentially facing divided parts 11, and radially facing divided parts 13.

The circumferentially pressed divided parts 9 are formed in a circumferentially deformable part 14 on a radially outer peripheral side and each have dividing line 9a that is oriented in a radial direction of the stator core 1 so as to pass through the center of curvature (center of rotation) of the yoke 3.

The circumferentially deformable part 14 is formed on the radially outer peripheral side of the yoke 3 and includes the outermost periphery of the yoke; and the circumferentially deformable part is annularly formed with a radial width of the circumferentially pressed divided parts 9 in a circumferential direction. The circumferentially deformable part 14 compressively deforms in the circumferential direction by the shrink-fitting of the stator core 1 into the inner peripheral side of the motor case 7 as will be described later.

The dividing line 9a is oriented in the radial direction through a tooth 5. In the present embodiment, an extension line of the dividing line 9a is set so as to pass through a center of the tooth 5 in a width direction thereof and a center of the stator core 1. The circumferentially pressed divided part 9 has divided surfaces pressed against each other in the circumferential direction by the tightening interference and includes the outermost periphery of the yoke 3.

The circumferentially facing divided parts 11 are provided on a radially inner peripheral side of the yoke 3 and each have a dividing line 11a that reaches a portion between teeth 5 and is oriented in the radial direction of the stator core 1. Accordingly, the dividing line 11a is oriented in the radial direction through the portion between the teeth 5. According to the present embodiment, an extension line of the dividing line 11a is set so as to pass through a center between the teeth 5 and the center of the stator core 1. The circumferentially facing divided parts 11 each have divided surfaces facing each other without a gap between them in the circumferential direction and the circumferentially facing divided parts 11 are shifted relative to the circumferentially pressed divided parts 9 in the circumferential direction.

The radially facing divided parts 13 are formed at a center between the radially inner and outer sides of the yoke 3 along the circumferential direction at a predetermined interval, and each have a dividing line 13a that is oriented in the circumferential direction. According to the present embodiment, the dividing line 13a is formed in an arc shape with a center of curvature that is the center of the stator core 1. The radially facing divided parts 13 are continuous at one ends with the respective circumferentially facing divided parts 11 and at the other ends with the respective circumferentially pressed divided parts 9.

Accordingly, the radially facing divided part 13 connects between the circumferentially pressed divided part 9 and the circumferentially facing divided part 11 in the circumferential direction and has divided surfaces facing each other in the radial direction.

The radially facing divided parts 13 may be formed with a radial gap between divided surfaces and, in this case, the divided surfaces may be also formed to be straight.

Radial lengths of the circumferentially pressed divided parts 9 and the circumferentially facing divided parts 11 are the same in the present embodiment. A compressive stress acting on the circumferentially facing divided part 11 is smaller than a compressive stress on the circumferentially pressed divided part 9, or is zero. According to the present embodiment, the compressive stress acting on the circumferentially facing divided parts.

Figure 4:
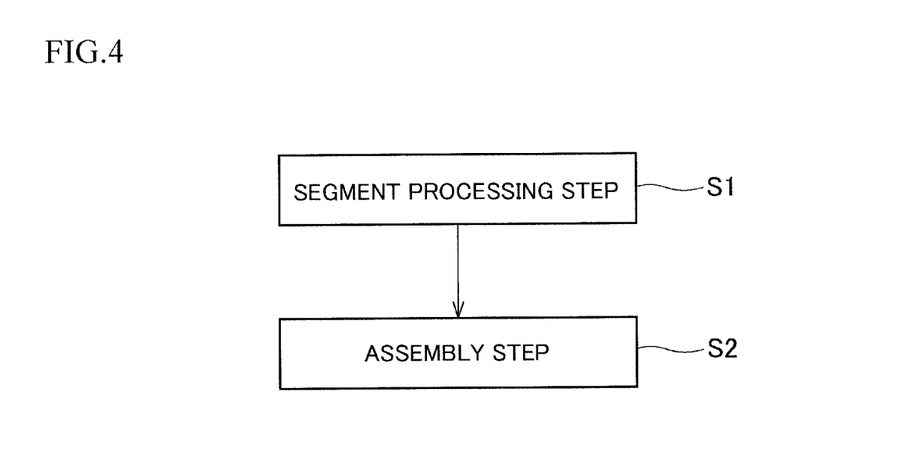
FIG. 4 is a process chart illustrating a stator core manufacturing method according to the first embodiment.
Figure 5:
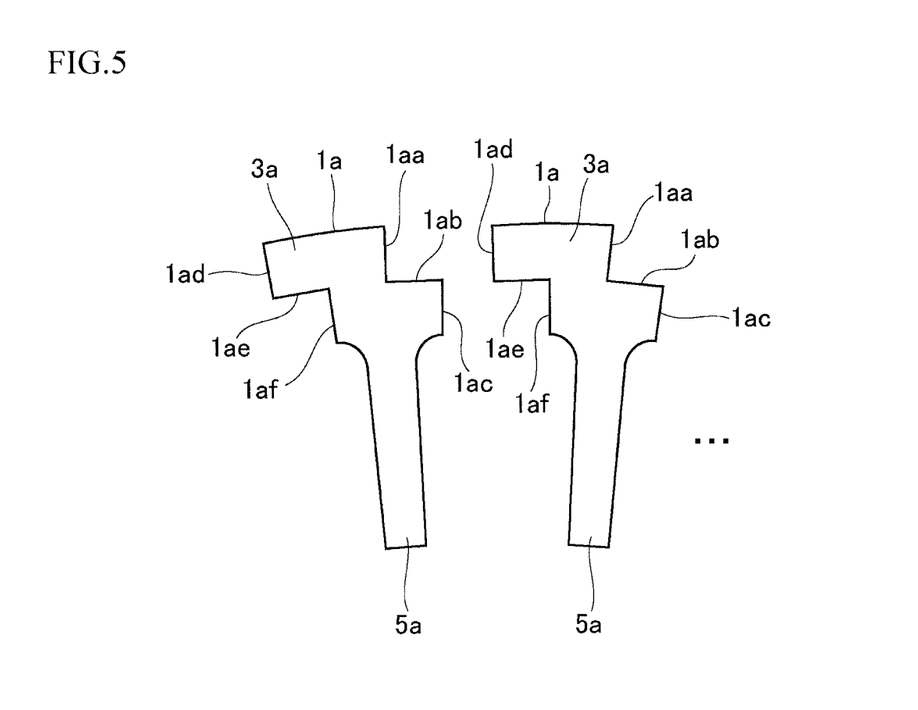
FIG. 5 is a front main part view illustrating stator core segments processed in a segment processing step according to the first embodiment.
Figure 6:
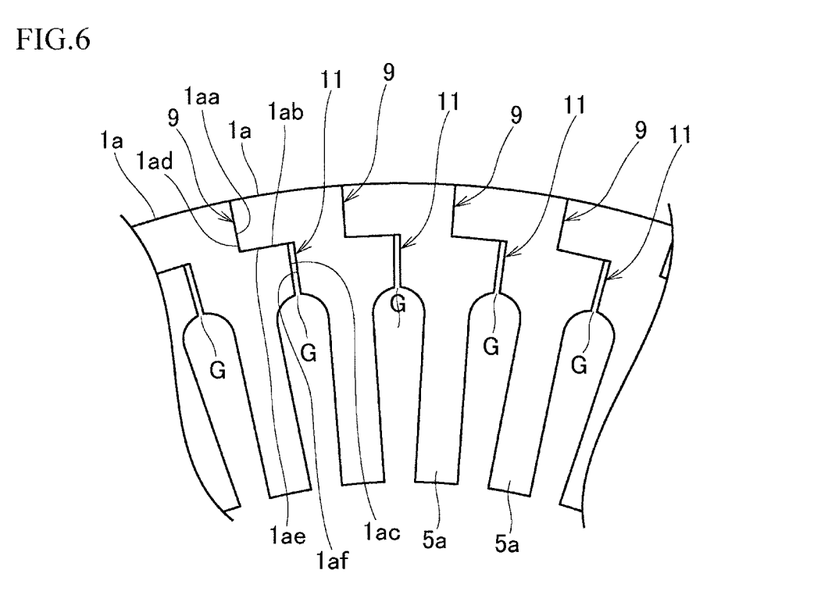
FIG. 6 is a front main part view illustrating the stator core segments in a joined state before shrink-fitting in an assembly step according to the first embodiment.

FIG. 4 is a process chart illustrating a stator core manufacturing method. FIG. 5 is a front main part view illustrating stator core segments processed in a segment processing step, and FIG. 6 is a front main part view illustrating the stator core segments in a joined state before shrink-fitting in an assembly step.

As illustrated in FIG. 4, the stator core manufacturing method according to the present embodiment comprises a segment processing step S1 and an assembly step S2, for manufacturing the stator core 1 for a motor.

The segment processing step S1 forms a plurality of stator core segments 1a . . . in the circumferential direction that are divided as illustrated in FIG. 5 with the circumferentially pressed divided parts 9, the circumferentially facing divided parts 11, and the radially facing divided parts 13 in FIG. 1. The stator core segments 1a . . . each have a yoke correspondent 3aa and a tooth correspondent 5a, and divided surfaces 1aa, 1ab, 1ac, 1ad, 1ac, and 1af. The divided surfaces 1ab and 1ae are formed in an arc shape in accordance with the dividing line 13a.

In the assembly step S2, the plurality of stator core segments 1a . . . are annularly joined together in the circumferential direction. In this joined state before the shrink-fitting, the divided surfaces 1aa and 1ad are in contact with each other in the circumferential direction and the divided surfaces 1ab and 1ae are in contact with each other in the radial direction, to form a gap G between the divided surfaces 1ac and 1af as illustrated in FIG. 6. The gap G is approximately 50 µm according to the present embodiment. The gap U however, is sufficient to allow a stress acting on the circumferentially facing divided part 11 to be put into a state of the compressive stress being smaller than the compressive stress acting on the circumferentially pressed divided part 9 or being zero due to the tightening interference.

Thereafter, a plurality of sets of the annularly joined stator core segments 1a . . . are stacked one on another in a thickness direction thereof and attached to the inner periphery of the motor case 7 by shrink-fitting with the radially inwardly tightening interference.

After completion of this attachment by shrink-fitting, the divided surfaces of the respective circumferentially pressed divided parts 9 are pressed against each other by the tightening interference. A circumferential distortion caused by the pressing is absorbed by moving the divided surfaces 1ab and 1ac of the respective radially facing divided parts 13 relative to each other in the circumferential direction so that the divided surfaces 1ac and 1af of the respective circumferentially facing divided parts 11 face each other in the circumferential direction without a gap as illustrated in FIG. 1.

In the stator core 1 according to the present embodiment, the compressive stress is generated in the circumferentially pressed divided parts 9, and the compressive stress on an inner diameter side relative to the radially facing divided parts 13 is zero.

As a result, there is no increase in iron loss on the inner diameter side relative to the radially facing divided parts 13, and magnetic flux passes efficiently from the teeth 5 through the circumferentially facing divided parts 11.

According to the first embodiment of the present invention, the stator core 1 for the motor includes an annular yoke 3 and teeth 5 protruding radially inward from the inner periphery of the yoke 3 and the outer periphery of the yoke 3 is attached to the inner periphery of the motor case 7 by shrink-fitting with the radially inwardly tightening interference. The stator core 1 comprises the circumferentially deformable part 14 that is formed on the radially outer peripheral side of the yoke 3 and has the circumferentially pressed divided parts 9 each having the dividing surfaces 1aa and 1ad pressed against each other in the circumferential direction by the tightening interference; the circumferentially facing divided parts 11 formed on the radially inner peripheral side of the yoke 3, each having the dividing line 11a that is oriented in the radial direction and reaches the portion between teeth 5, and having the divided surfaces 1ac and 1af that face each other without a gap; and the radially facing divided parts 13 formed at the center or at a portion closer to the outer periphery or elsewhere between the radially inner and outer sides of the yoke 3 along the circumferential direction at the predetermined interval, and each having the divided surfaces 1ab and 1ae that face each other in the radial direction, and being continuous at one ends with the respective circumferentially facing divided parts 11 and at the other ends with the respective circumferentially pressed divided parts 9, the divided surfaces 1ab and 1ac moved relative to each other in the circumferential direction by the compressive deformation of the circumferentially deformable part 14. The circumferentially facing divided parts 11 are in a state of the compressive stress being smaller than the compressive stress acting on the circumferentially pressed divided parts 9 or being zero.

As a result, the magnetic flux is efficiently passed from the teeth 5 through the circumferentially facing divided parts 11 as mentioned above, thereby enhancing the output efficiency of the motor.

In the case of the above-described conventional one of a slit type, it is physically difficult to eliminate the slits. In the present embodiment, even if dimensions are relatively rough by setting the circumferentially pressed divided parts 9 and the circumferentially facing divided parts 11 in a stepped shape, the divided surfaces of the respective circumferentially facing divided parts 11 easily face each other without a gap in zero compressive stress due to the circumferential distortion from the circumferentially pressed divided parts 9 to the circumferentially facing divided parts 11. This securely improves the output efficiency of the motor.

The circumferentially pressed divided parts 9 includes the outermost periphery of the yoke 3.

Accordingly, the circumferentially pressed divided parts 9 can be provided on the an outermost peripheral side, thereby allowing the circumferentially facing divided parts 11 to be formed surely on the inner peripheral side.

The dividing lines 9a and 11a are oriented to the center of the curvature of the yoke 3.

Accordingly, the divided surfaces of the circumferentially pressed divided parts 9 are securely pressed by the tightening interference of the shrink-fitting, the divided surfaces of the radially facing divided parts 13 easily face each other without a gap, and the circumferentially facing divided parts 11 are securely formed with less magnetic resistance and less iron loss.

The radial lengths of the circumferentially pressed divided parts 9 and the circumferentially facing divided parts 11 are the same.

As a result, compressive force by the shrink-fitting is received by the pressed divided surfaces of the circumferentially pressed divided parts 9, thereby making the divided surfaces of the radially facing divided parts 13 face each other without a gap.

The dividing tines 9a of the circumferentially pressed divided parts 9 are oriented in the radial direction through the respective teeth 5 and the dividing lines 11a of the circumferentially facing divided parts 11 are oriented in the radial direction through the respective portions between the teeth 5.

As a result, the circumferentially pressed divided parts 9 can be formed without dividing the teeth 5.

The stator core manufacturing method includes the segment processing step S1 of forming the plurality of stator core segments 1a . . . in the circumferential direction divided at the circumferentially pressed divided parts 9, the circumferentially facing divided parts 11, and the radially facing divided parts 13; and the assembly step S2 of joining the plurality of stator core segments 1a . . . annularly in the circumferential direction and attaching the plurality of stator core segments to the inner periphery of the motor case 7 with the radially inwardly tightening interference, thereby pressing the divided surfaces 1aa and 1ad of the respective circumferentially pressed divided parts 9 against each other and facing the divided surfaces 1ac and 1af of the respective circumferentially facing divided parts 11 without a gap between them.

Accordingly, through the segment processing step S1 and the assembly step S2, the stator core 1 that is provided with the circumferentially pressed divided parts 9, the circumferentially facing divided parts 11, and the radially facing divided parts 13 is securely formed.

Figure 7:
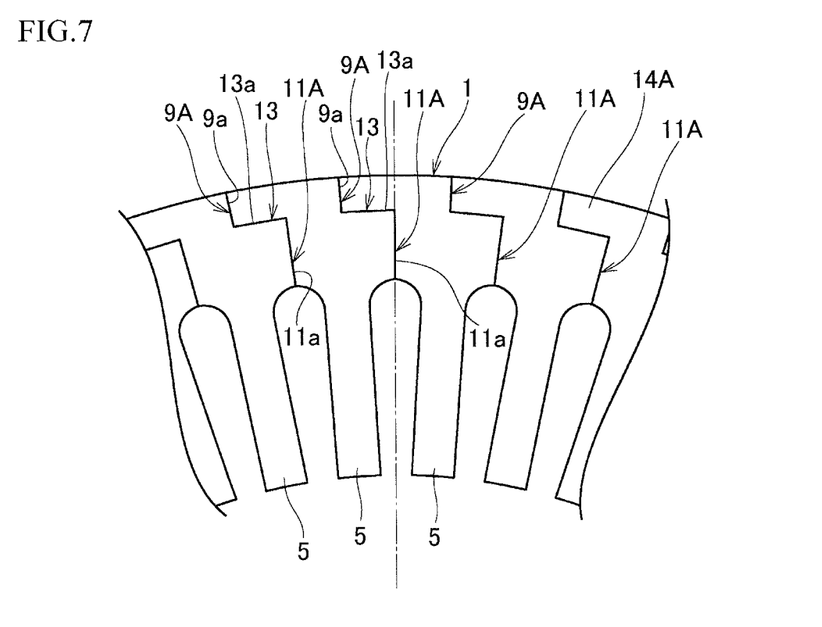
FIG. 7 is a front main part view illustrating a stator core according to a modification according to the first embodiment.

FIG. 7 is a front main part view illustrating a stator core according to a modification. In a stator core 1A, radial lengths of circumferentially pressed divided parts 9A are formed relatively short, and radial lengths of circumferentially facing divided parts 11A are formed relatively long.

Accordingly, the radial lengths of the circumferentially facing divided parts 11A that involve compressive stress being smaller than compressive stress acting on the circumferentially pressed divided parts 9A or being zero are enlarged. The circumferentially deformable part 14A has an increased deformability due to a reduced width in a radial direction, and further reduces magnetic resistance, prevents the increase in iron loss.

Second Embodiment

Figure 8:
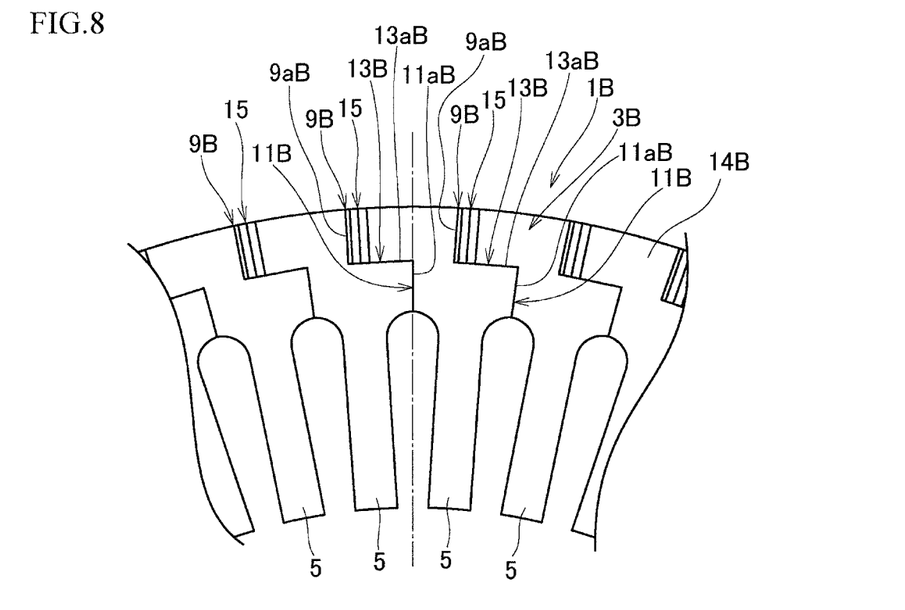
FIG. 8 is a front main part view illustrating a stator core according to a second embodiment.
Figure 9:
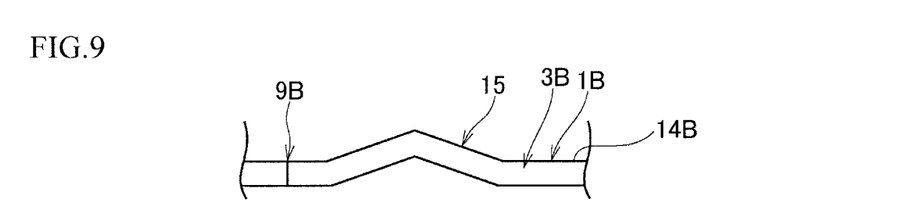
FIG. 9 is a side view illustrating a flexible portion of the stator core according to the second embodiment.
Figure 10:
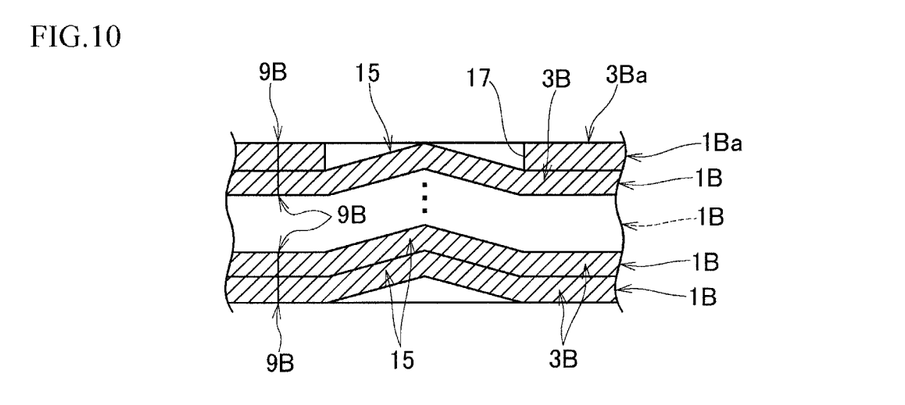
FIG. 10 is a sectional view partly illustrating a stack of the stator cores according to the second embodiment.

FIGS. 8 to 10 are drawings according to a second embodiment of the present invention, in which FIG. 8 is a front main part view illustrating a stator core, FIG. 9 is a side view illustrating a flexible portion of the stator core, and FIG. 10 is a sectional view partly illustrating a stack of the stator cores. The basic structure according to the present embodiment is the same as that of the first embodiment, and the same parts will be represented with the same numerals and corresponding parts will be represented with the same numerals with "B" to omit duplicate description.

The stator core 1B according to the present embodiment, as illustrated in FIGS. 8 to 10, is provided with flexible portions 15 adjoining respective circumferentially pressed divided parts 9B in a circumferentially deformable part 14B for securing an amount of deformation in a circumferential direction. The flexible portions 15 have a convex concave portion in a thickness direction of a yoke 3B. According to the present embodiment, the convex-concave portions of the flexible portions 15 have a triangular chevron shape in the thickness direction in a cross section. The sectional shape of each flexible portion 15 is formed so that, when the stator cores 1B are stacked, the flexible portions are closely stacked one on another, or, when producing the stack, the flexible portions are closely stacked under pressure.

As illustrated in FIG. 10, a yoke 3Ba of the stator core 1Ba at an end has a cutout 17 formed to escape an adjacent flexible portion 15.

Accordingly, the present embodiment also provides the same effects as the first embodiment due to the presence of the circumferentially pressed divided parts 9B, the circumferentially facing divided parts 11B, and the radially facing divided parts 13B. Furthermore, in the present embodiment, since the amount of compression of the circumferentially pressed divided parts 9B due to the shrink-fitting is increased by the flexible portions 15, gaps formed in the circumferentially facing divided parts 11B before the shrink-fitting is set to, for example, approximately 70 μm to facilitate the setting of the gaps.

Figure 11:
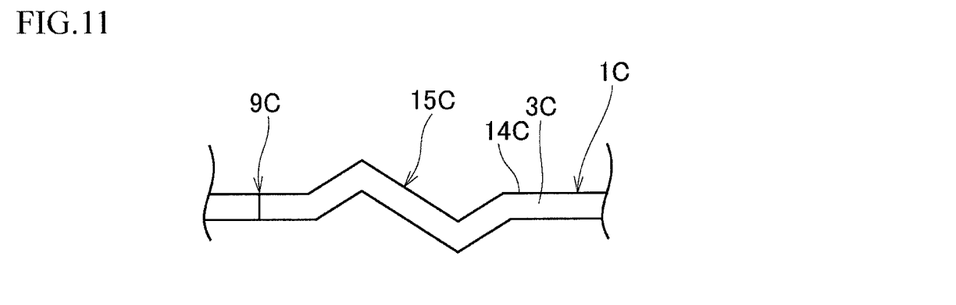
FIG. 11 is a side view illustrating a flexible portion of a stator core according to a modification of the second embodiment.
Figure 12:
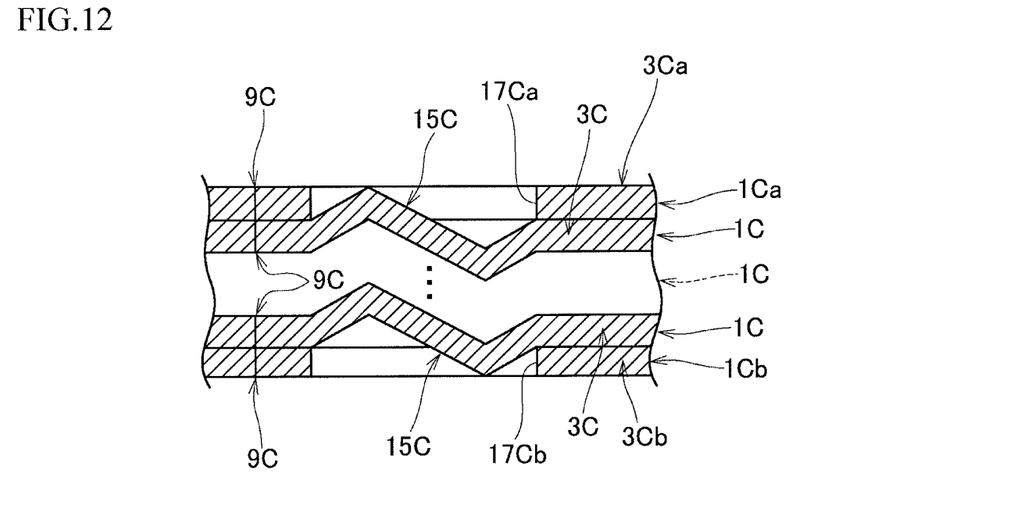
FIG. 12 is a sectional view partly illustrating a stack of the stator cores according to the modification of the second embodiment.

FIG. 11 is a side view illustrating a flexible portion of a stator core according to a modification, and FIG. 12 is a sectional view partly illustrating a stack of the stator cores of according to the modification. The basic structure of the modification is the same as that of the example in FIGS. 8 to 10, and the same parts will be represented with the same numerals and corresponding components will be represented with the same characters with "C" omit duplicate description.

In a stator core 1C of FIGS. 11 and 12, a convex-concave portion of a flexible portion 15C provided in a circumferentially deformable part 14C has a triangular chevron shape in a thickness direction in a cross section so that the convex-concave portion protrudes both forward and rearward in a direction along an axis of the stator core 1C. The yokes 3Ca and 3Cb of stator cores 1Ca and 1Cb at both ends have cutouts 17Ca and 17Cb formed in a shape to escape adjacent flexible portions 15C.

With this modification, the amount of deformation of the flexible portions 15C is further increased relative to the example in FIGS. 8 to 10, thereby further easily setting gaps in the circumferentially facing divided parts (corresponding to the circumferentially facing divided parts 11B of FIG. 8).

Figure 13:
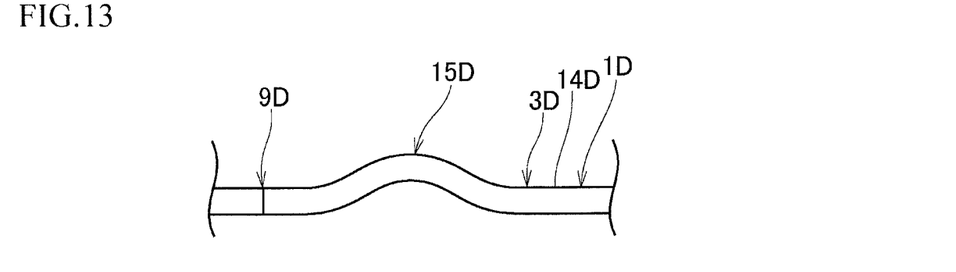
FIG. 13 is a side view illustrating a flexible portion of a stator core according to another modification of the second embodiment.
Figure 14:
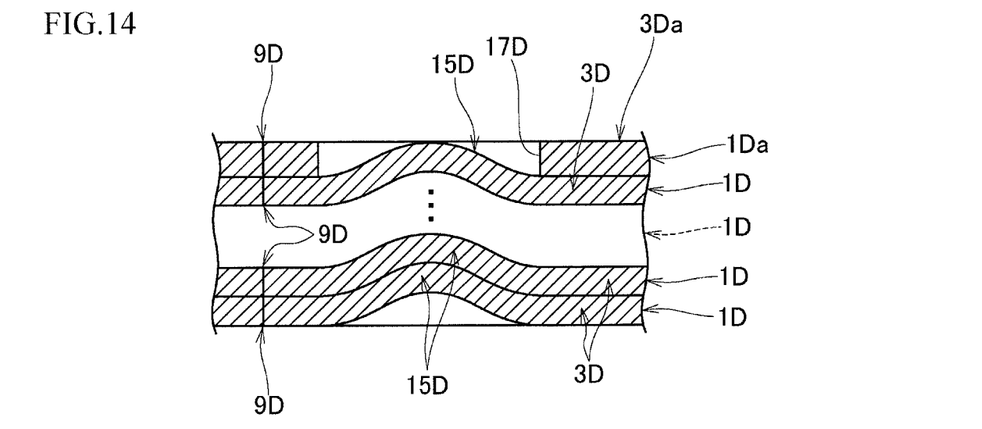
FIG. 14 is a sectional view partly illustrating a stack of the stator cores according to the modification of the second embodiment.

FIG. 13 is a side view illustrating a flexible portion of a stator core according to another modification and FIG. 14 is a sectional view partly illustrating a stack of the stator cores according to the modification. The basic structure of the modification is the same as that of the example in FIGS. 8 to 10, and the same parts will be represented with the same characters and corresponding parts will be represented with the same numerals with "D" to omit duplicate description.

In a stator core 1D of FIGS. 13 and 14, a convex-concave portion of a flexible portion 15D provided in a circumferentially deformable part 4D has a curved chevron shape in a thickness direction in a cross section. A yoke 3Da of the stator core 1Da at an end has a cutout 17D formed in a shape to escape an adjacent flexible portion 15D.

Accordingly, the modification provides substantially the same effects as the example of FIGS. 8 to 10.

Figure 15:
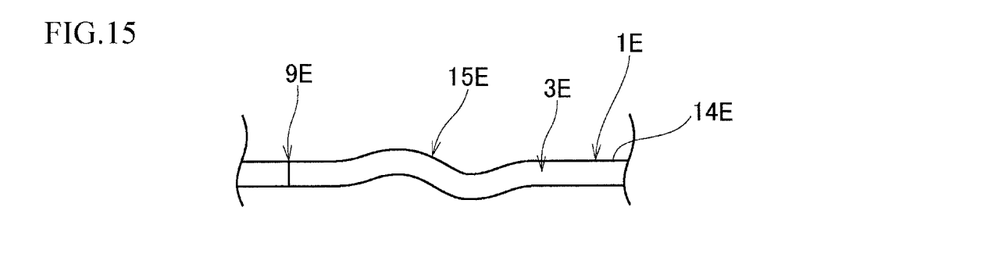
FIG. 15 is a side view illustrating a flexible portion of a stator core according to still another modification of the second embodiment.
Figure 16:
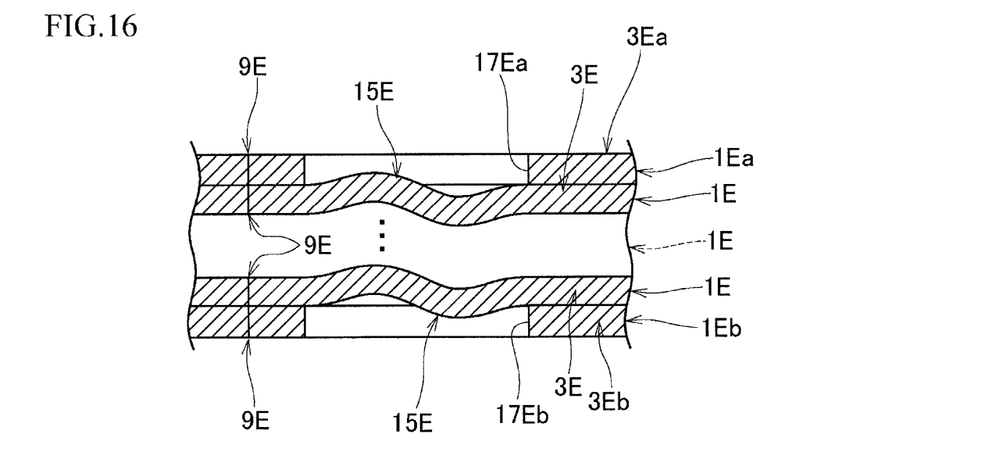
FIG. 16 is a sectional view partly illustrating a stack of the stator cores according to the modification of the second embodiment.

FIG. 15 is a side view illustrating a flexible portion of a stator core according to still another modification and FIG. 16 is a sectional view partly illustrating a stack of the stator cores according to the modification. In a stator core 1E of FIGS. 15 and 16, a convex-concave portion of a flexible portion 15E provided in a circumferentially deformable part 14E has a curved chevron shape in a thickness direction in a cross section so that the convex-concave portion protrudes both forward and rearward in a direction along an axis of the stator core 1E. The yokes 3Ea and 3Eb of stator cores 1Ea and 1Eb at both ends have cutouts 17Ea and 17Eb formed in a shape to escape adjacent flexible portions 15E. The modification provides substantially the same effects as the modification of FIGS. 11 and 12.

Third Embodiment

Figure 17:
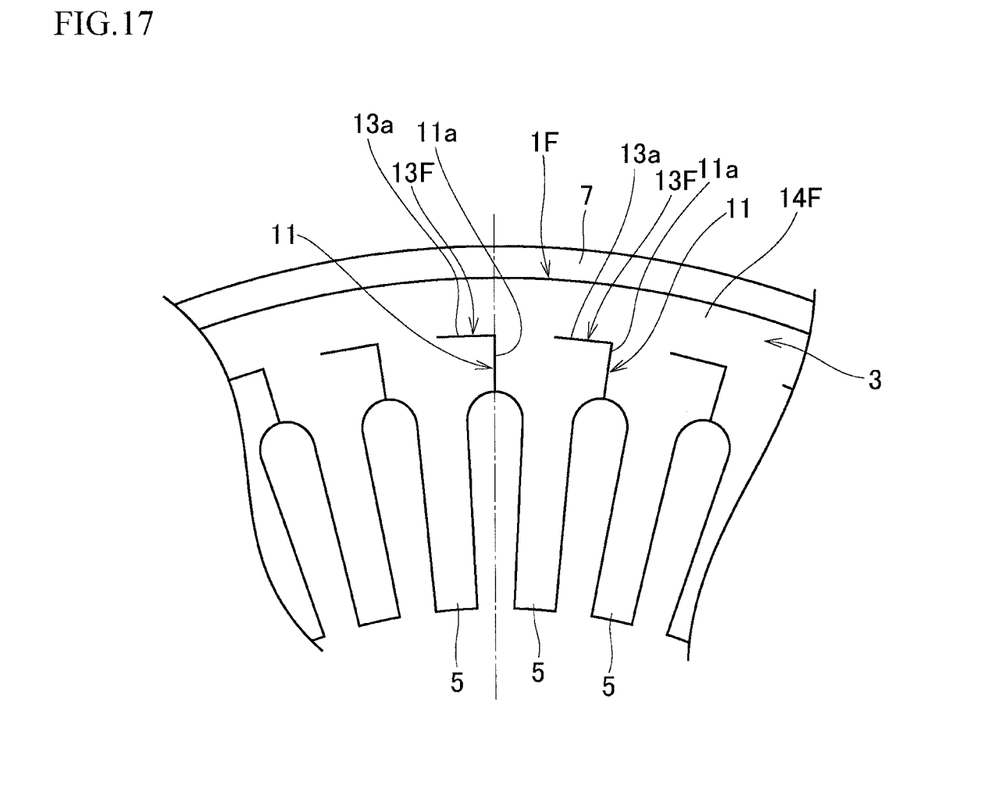
FIG. 17 is a front main part view illustrating a state of a stator core attached to a motor case by shrink-fitting according to a third embodiment.
Figure 18:
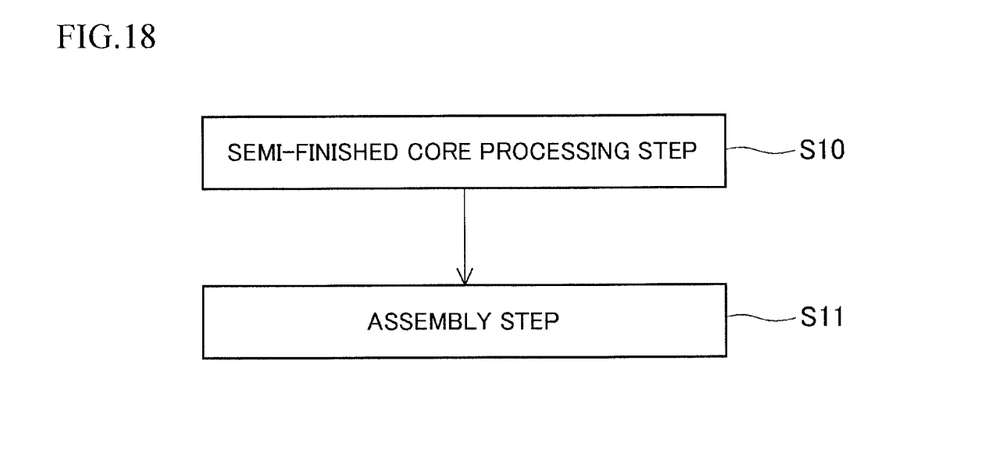
FIG. 18 is a process chart illustrating a stator core manufacturing method according to the third embodiment.
Figure 19:
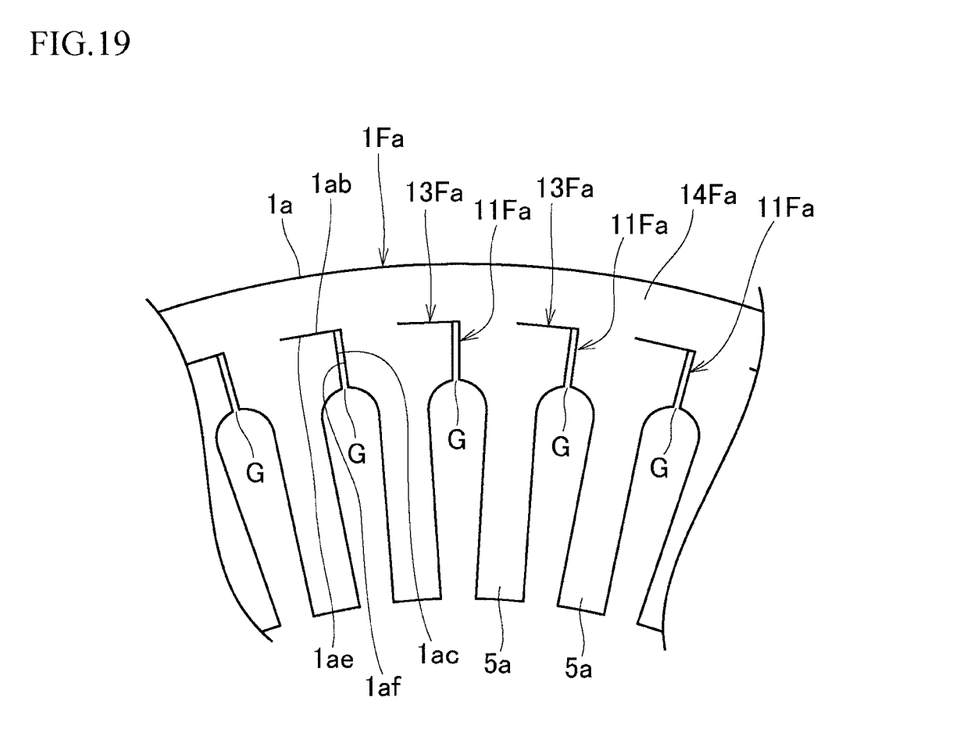
FIG. 19 is a front main part view illustrating a state of a semi-finished stator core before shrink-fitting according to the third embodiment.

FIGS. 17 to 19 are drawings according to a third embodiment of the present invention in which FIG. 17 is a front main part view illustrating a state of a stator core attached to a motor case by shrink-fitting, FIG. 18 is a process chart illustrating a stator core manufacturing method, and FIG. 19 is a front main part view illustrating a state of a semi-finished stator core before the shrink-fitting. The basic structure of the present embodiment is the same as that of the first embodiment, and the same parts will be represented with the same numerals and corresponding components will be represented with the same numerals with "F" to omit duplicate description.

As illustrated in FIG. 17, a stator core 1F of the present third embodiment is provided with a circumferentially deformable part 14F having no circumferentially pressed divided parts and is a circumferentially continuous ring part. A radially facing divided parts 13F are continuous at one ends with respective circumferentially facing divided parts 11 and closed at the other ends.

As illustrated in FIG. 18, a stator core manufacturing method according to the present embodiment has a semi-finished core processing step S10 and an assembly step S11, for producing a stator core 1F for a motor.

In the semi-finished core processing step S10, a semi-finished core 1Fa illustrated in FIG. 19 is formed. The semi-finished core 1Fa is provided with circumferentially facing divided part correspondents 11Fa, radially facing divided part correspondents 13Fa, a circumferentially deformable part correspondent 14Fa, and teeth correspondents 5a, and divided surfaces 1ab, 1ae, 1ac, and 1af.

The circumferentially facing divided part correspondents 11Fa, the radially facing divided part correspondents 13Fa, the circumferentially deformable part correspondent 14Fa, and the teeth correspondents 5a correspond to the circumferentially facing divided parts 11, the radially facing divided parts 13F, the circumferentially deformable part 14F, and the teeth 5 in FIG. 17.

As illustrated in FIG. 19, the semi-finished core 1Fa before shrink-fitting has a gap G between the divided surfaces 1ac and 1af. This gap G is approximately 50 μm in the present embodiment. The requirements for the gap G are as mentioned above.

In the assembly step S11 of FIG. 18, semi-finished cores 1Fa . . . of FIG. 19 are stacked one on another in a thickness direction and attached to an inner periphery of a motor case 7 of FIG. 17 by shrink-fitting with a radially inwardly tightening interference.

After completion of this attachment by the shrink-fitting, the circumferentially deformable part correspondent 14Fa of FIG. 19 is compressed in a circumferential direction due to the tightening interference. A circumferential distortion caused by this compression is absorbed by moving the divided surfaces 1ab and 1ac of the respective radially facing divided part correspondents 13Fa relative to each other in the circumferential direction, thereby making the divided surfaces 1ac and 1af the respective circumferentially facing divided parts 11 face each other without a gap as illustrated in FIG. 17.

Accordingly, in the present embodiment, the circumferentially facing divided parts 11 can be put into a state of compressive stress being smaller than compressive stress acting on the circumferentially deformable parts 9 or being zero, thereby providing the same effects as the first embodiment.

Furthermore, since the semi-finished core 1Fa is not divided, it is easy to handle and reduces the number of parts for easy assembly and easy parts control.

Incidentally, the present embodiment may also form flexible portions on an outer peripheral side or elsewhere relative to the radially facing divided parts 13F, thereby facilitating the compressive deformation of the circumferentially deformable part 14F.

The radial width of the circumferentially deformable part 14F may be relatively narrow and the radial length of the circumferentially facing divided parts 11 may be relatively long. In this case, the compressive deformation of the circumferentially deformable part 14F by the tightening interference can be made easier.

Figure 20:
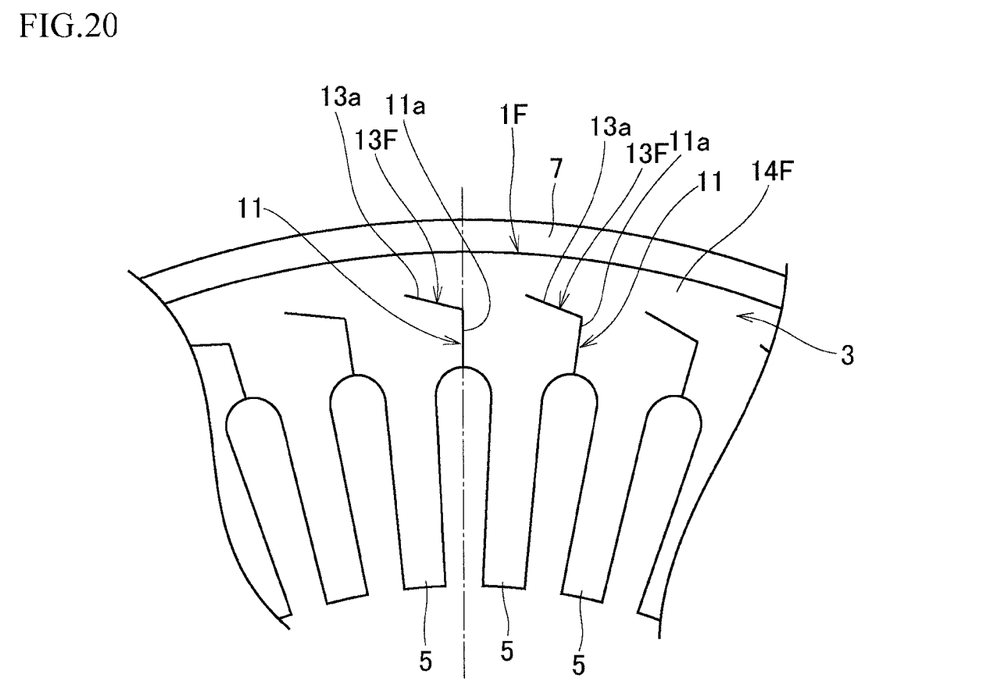
FIG. 20 is a front main part view illustrating a state of a stator core according to a modification of the third embodiment attached to a motor case by shrink-fitting.

FIG. 20 is a front main part view illustrating a state of a stator core according to a modification of the third embodiment attached to a motor case by shrink-fitting.

In this modification, dividing lines 13a of radially facing divided parts 13F are set to be inclined so that one ends of the dividing lines continuous to respective circumferentially facing divided parts 11 are located on an inner peripheral side relative to the other closed ends. Accordingly, when divided surfaces of the radially facing divided part 13F move relative to each other in a circumferential direction by compressive deformation at the time of shrink-fitting, the divided surfaces come in closely contact with each other.

Even if the divided surfaces of the radially facing divided part 13F do not come in closely contact with each other by the compressive deformation at the time of the shrink-fitting, the gap between the divided surfaces can be minimized to improve magnetic properties.

Incidentally, such setting of the dividing line 13a is also equally applicable to the stator cores 1, 1B, 1C, 1D, and 1E of the first and second embodiments.

The invention claimed is:

1. A stator core for a motor including an annular yoke and teeth protruding radially inward from an inner periphery of the yoke, an outer periphery of the yoke attached to an inner periphery of an annular member with a radially inwardly tightening interference, comprising:
- a circumferentially deformable part formed on a radially outer peripheral side of the yoke and compressively deformed in a circumferential direction by the tightening interference;
- circumferentially facing divided parts formed on a radially inner peripheral side of the yoke, and each having a dividing line that is oriented in a radial direction and reaches a portion between the teeth and divided surfaces that face each other without a gap; and
- radially facing divided parts formed between the radially inner and outer sides of the yoke along the circumferential direction at a predetermined interval, each having divided surfaces that face each other in the radial direction, and being continuous at one ends with the respective circumferentially facing divided parts, the divided surfaces moved relative to each other in the circumferential direction by compressive deformation of the circumferentially deformable part, wherein
- the circumferentially facing divided parts are in a state of a compressive stress being smaller than a compressive stress acting on the circumferentially deformable part or being zero,
- the circumferentially deformable part has a flexible portion for securing an amount of the deformation in the circumferential direction, and
- the flexible portion is a convex-concave portion in a thickness direction of the yoke having a chevron shape, a top of the chevron shape in said thickness direction linearly extending between the outer periphery of the yoke and the radially-facing divided part in a direction intersecting the circumferential direction.

2. The stator core according to claim 1, wherein:
the circumferentially deformable part has circumferentially pressed divided parts each having a dividing line oriented in the radial direction and divided surfaces pressed against each other by the tightening interference and being continuous with respective other ends of the circumferentially facing divided parts.

3. The stator core according to claim 2, wherein:
radial lengths of the circumferentially pressed divided parts and the circumferentially facing divided parts are the same.

4. The stator core according to claim 2, wherein:
radial lengths of the circumferentially pressed divided parts are shorter than radial lengths of the circumferentially facing divided parts.

5. The stator core according to claim 2, wherein:
the dividing lines of the circumferentially pressed divided parts are oriented in the radial direction through the respective teeth; and
the dividing lines of the circumferentially facing divided parts are oriented in the radial direction through the respective portions between the teeth.

6. A stator core manufacturing method for manufacturing the stator core for a motor according to claim 2, comprising:
dividing a plurality of circumferential stator core segments at the circumferentially pressed divided parts, the circumferentially facing divided parts, and the radially facing divided parts;
joining the plurality of stator core segments annularly in the circumferential direction and applying radially inwardly tightening interference to attach the plurality of stator core segments to the inner periphery of the annular member; and
pressing the divided surfaces of the respective circumferentially pressed divided parts against each other and facing the divided surfaces of the respective circumferentially facing divided parts without a gap in the circumferential direction.

7. The stator core manufacturing method according to claim 6, wherein:
the attachment to the annular member with the tightening interference is carried out by shrink-fitting.

8. The stator core according to claim 2, wherein:
the circumferentially deformable part includes an outermost periphery of the yoke.

9. The stator core according to claim 2, wherein:
the dividing lines of the circumferentially facing divided parts are oriented to a center of curvature of the yoke.

10. The stator core according to claim 1, wherein:
the circumferentially deformable part is a ring part continuous in the circumferential direction.

11. A stator core manufacturing method for manufacturing the stator core for a motor according to claim 10, comprising:
forming a semi-finished stator core having the ring part, circumferentially facing divided part correspondents, and radially facing divided part correspondents; and
applying radially inwardly tightening interference to attach the semi-finished stator core to the inner periphery of the annular member, thereby causing compressive deformation of the ring part and facing the divided surfaces of the respective circumferentially facing divided parts without a gap in the circumferential direction.

12. The stator core manufacturing method according to claim 11, wherein:
the attachment to the annular member with the tightening interference is carried out by shrink-fitting.

13. The stator core according to claim 10, wherein:
the circumferentially deformable part includes an outermost periphery of the yoke.

14. The stator core according to claim 10, wherein:
the dividing lines of the circumferentially facing divided parts are oriented to a center of curvature of the yoke.

15. The stator core according to claim 1, wherein:
the circumferentially deformable part includes an outermost periphery of the yoke.

16. The stator core according to claim 15, wherein:
the dividing lines of the circumferentially facing divided parts are oriented to a center of curvature of the yoke.

17. The stator core according to claim 1, wherein:
the dividing lines of the circumferentially facing divided parts are oriented to a center of curvature of the yoke.

18. The stator core according to claim 1, wherein:
dividing lines of the radially facing divided parts are set to be inclined so that said one ends are continuous with the respective circumferentially facing divided parts and said one ends are located on an inner peripheral side relative to other ends, said other ends being closed.

19. The stator core according to claim 1, wherein the top of the chevron shape of the flexible portion spans from the outer periphery of the yoke to the radially-facing divided part.

20. The stator core according to claim 1,
wherein each one dividing line of said dividing lines of the radially facing divided parts is set to be inclined so that one end of said one dividing line is continuous with a corresponding one of the circumferentially facing divided parts;
wherein said one end is located on an inner peripheral side of the yoke relative to an opposite end of said one dividing line; and
wherein said other end is closed.

* * * * *